Feb. 26, 1963　　　L. D. SHOEMAKER　　　3,078,892
MACHINE FOR SHREDDING HYDROPONIC MATS
Filed July 12, 1961　　　　　　　　　　　　6 Sheets-Sheet 1

INVENTOR.
Loy D. Shoemaker,
BY Just & Irish
Attorneys.

Feb. 26, 1963

L. D. SHOEMAKER

3,078,892

MACHINE FOR SHREDDING HYDROPONIC MATS

Filed July 12, 1961

INVENTOR.
LOY D. SHOEMAKER

BY Gust & Irish

ATTORNEYS

Feb. 26, 1963 L. D. SHOEMAKER 3,078,892
MACHINE FOR SHREDDING HYDROPONIC MATS
Filed July 12, 1961 6 Sheets-Sheet 4

INVENTOR.
LOY D. SHOEMAKER
BY Gust & Irish
ATTORNEYS

Feb. 26, 1963 L. D. SHOEMAKER 3,078,892
MACHINE FOR SHREDDING HYDROPONIC MATS
Filed July 12, 1961 6 Sheets-Sheet 5

INVENTOR.
LOY D. SHOEMAKER
BY *Gust + Irish*
ATTORNEYS

United States Patent Office 3,078,892
Patented Feb. 26, 1963

3,078,892
MACHINE FOR SHREDDING HYDROPONIC MATS
Loy D. Shoemaker, R.R. 2, North Liberty, Ind.
Filed July 12, 1961, Ser. No. 124,309
21 Claims. (Cl. 146—123)

The present invention relates to a machine for shredding hydroponic mats. This application is a continuation-in-part of my application Serial Number 23,826 filed April 21, 1960, now abandoned.

The art of hydroponics is of relatively recent origin, and within recent years has been found to be useful in producing green feed for cattle. This feed is in the form of young, tender oats plants, these plants having been grown in hydroponic buildings (complete enclosures) in which temperature, light and moisture are closely controlled for obtaining maximum rate of plant growth.

In preparing hydroponic oats, a multiplicity of trays are used, each tray having a reticulate web or screen as the bottom. A specially chemically treated paper is laid on this screen bottom and seed is deposited upon the paper. The tray is then placed in proper supports inside a hydroponic building and is allowed to remain there for a few days, sometimes less than a week. The seed rapidly sprouts and the oats plant rapidly grows in a period of only a few days to about six to eight (6 to 8) inches in height, the root system extending two or three (2 or 3) inches downwardly below the bottom of the tray. The root system of the various plants intertwine so that the quantity of plants becomes entangled and matted together, the original paper providing some support for maintaining the entire tray of plants in a single mass.

When it is desired to harvest the plants, the trays are emptied by merely peeling or otherwise removing the mat of plants from the tray, this mat being self-supporting because of the entanglement of the root system as well as the presence of the paper through which the plants have grown. This being true, the mat may be handled as a unitary product.

Before the oats plants are fed to cattle, it has been discovered that the mats must be shredded or torn apart into small segments or individual plants, the plants in either form containing preferably both the root and stem portions. It has been found that unless the mats are shredded, the cattle will eat only the green portion of the plants, thereby wasting the roots, and, since the roots contain substantial food value, it is desired that the cattle eat both the plant stem and the root. By shredding the mats in such a way that the roots and stems cannot be segregated by the cattle, the cattle thereby consume the entire plant, receiving the full food value therefrom.

Such mats may be manually shredded or torn apart; however, since a substantial quantity of feed is required for herds of cattle, manual shredding becomes impractical as well as exorbitantly expensive. For this reason, it is desirable to provide a machine for shredding the mats in a minimum of time with a minimum of expense, and several different designs of such machines have been proposed but none have been found to be practical. It has been discovered that these hydroponic oats are so soft, tender and juicy that these prior machines have quickly clogged or become unserviceable, and it has also been discovered that prior art machines for chopping and shredding fodder, silage and other types of feed cannot be used in shredding hydroponic mats.

It is therefore an object of this invention to provide a machine capable of efficiently shredding hydroponic mats over a long period of time without becoming clogged or otherwise unserviceable.

It is still another object of this invention to provide a uniquely designed rotor for use in a machine for shredding hydroponic mats.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein.

Referring to FIGS. 1 through 5 of the drawings, the machine for shredding hydroponic mats comprises a cylindrical housing 10 formed of suitable rigid sheet metal having an axially extending exhaust opening 12 (facing downwardly) and a similar opening 14 angularly spaced therefrom for receiving mats fed to the interior of the housing 10. The housing 10 is provided with opposite end plates 16 and 18, suitable supporting legs 20 and 22 being secured to these end plates, respectively. Extending upwardly and arcuately from the housing 10 is an enclosed chute 24 having a first opening 26 through which hydroponic mats are fed and another opening at the opposite end which matches the housing opening 14. A shelf or table 28 extends rearwardly from the chute 26, a third leg 30 being attached to this leg for providing stable support for the machine.

In the housing 10 is a rotor, indicated generally by the reference numeral 32. This rotor is shown in phantom lines in FIGS. 1 and 2 and in detail in FIGS. 3, 4 and 5. The rotor comprises a shaft 34 journaled at its opposite ends in the housing end plates 16 and 18, respectively, the axis of this shaft 34 coinciding with the axis of the housing 10. On the shaft 34 are mounted a plurality of cutters, each indicated generally by the reference numerals 36, these cutters preferably being axially spaced on the shaft 34 equal distances apart. Since all of the cutters 36 are structurally identical, the description of one will suffice for all.

Figure 5:
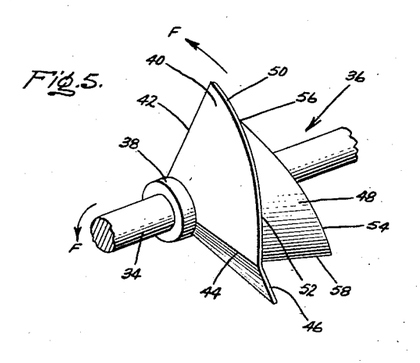
FIG. 5 is a perspective illustration of one of the cutters used in the rotor of FIGS. 3 and 4.
Figure 6:
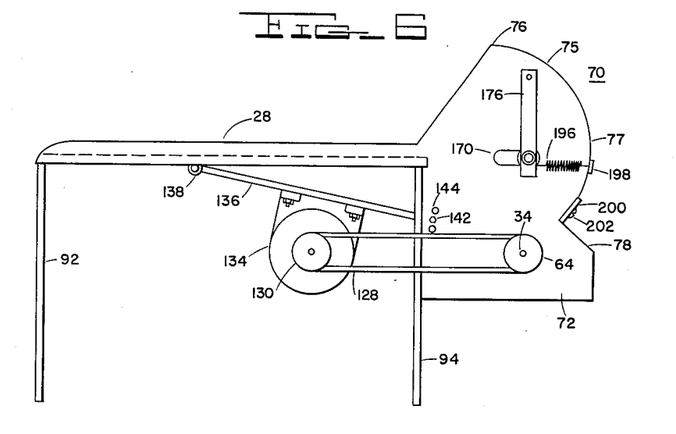
FIG. 6 is an elevational view of one side of another embodiment of my invention.

Each cutter comprises a collar 38 secured to the shaft 34 by means of set screws or the like (not shown).

Welded or otherwise secured to the outer periphery of the collar 38 is a quarter segment 40 of a disc of steel sheet metal, this sheet metal having a thickness of, for example, one-eighth (⅛) inch. This quarter segment 40 is secured to the collar 38 in such position that it will lie in a plane perpendicular to the shaft axis, the reason for this mounting becoming apparent from the following description.

With the shaft 34 and the cutter rotating in the direction of the arrows F, the radial edge 42 of the segment 40 becomes the leading edge. Preferably, this leading edge 42 is sharpened. The aft portion of the quarter segment 40 is bent inwardly substantially along the radius 44 to an obtuse angle as shown, thereby providing a deflector 46. The purpose of this deflector 46 will become apparent from the following description.

A part-cylindrical cutting blade 48 of rigid sheet metal having a curvature corresponding identically to the curvature of the outer perimeter 50 of the segment 40 is secured along one lateral edge 52 thereof to the circumferential face of perimeter 50. The opposite lateral edge 54 of the blade 48 angles or tapers from a point 56 disposed a short distance rearwardly from the leading edge 42 outwardly and away from the segment 40 until it terminates in the rear edge 58 adjacent to the deflector 46. The cutter thus comprises essentially three portions, the flat segment 40 which lies in a plane perpendicular to the axis of the shaft 34, the deflector 46 and the part-cylindrical blade 48. The center of the curvature of the part-cylindrical blade 48 is the axis of the shaft 34 the same as the perimeter 50 of the disc segment 40. Preferably, the edge 54 of the blade 48 is sharpened.

Figure 3:
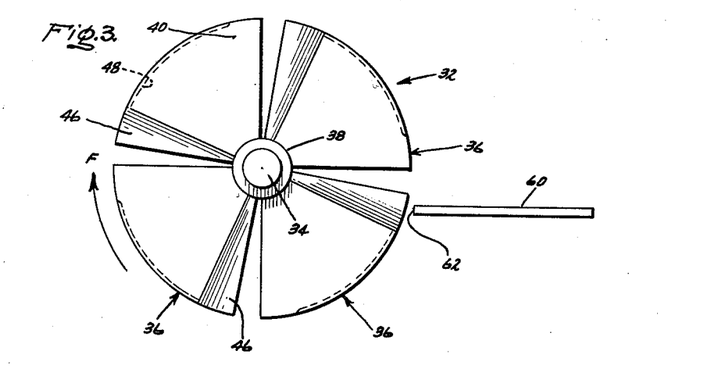
FIG. 3 is an enlarged end view of the rotor and shear plate of the machine of FIGS. 1 and 2.
Figure 4:
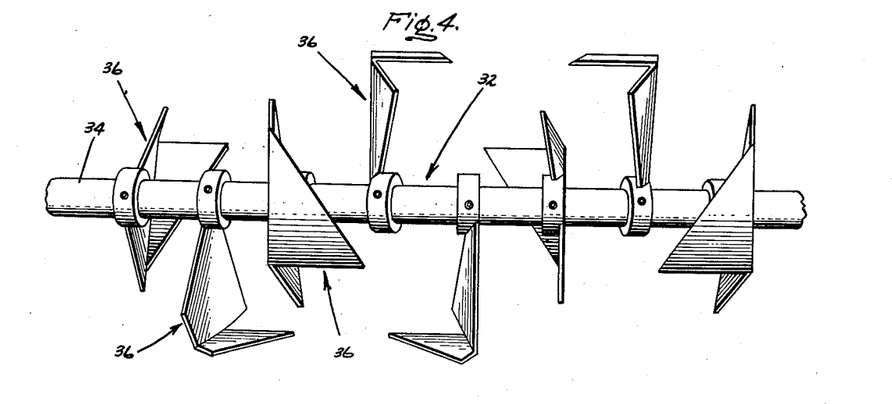
FIG. 4 is a side view of the rotor of FIG. 3.

The individual cutters 36 are secured to the shaft 34 in angularly staggered relation as shown more clearly in FIGS. 3 and 4. Progressing from the left-hand end of the shaft 34 of FIG. 4 toward the right-hand end, the cutters 36 are angularly spaced progressively by 90° until the mid-point of the shaft is reached. Proceeding from the righ-hand end of the shaft toward the left-hand end, the same angular relationship between the adjacent cutters prevails with the exception that the endmost cutter is disposed at an angle of 180° from the cutter on the left-hand end of the shaft. The blades 48 of both the left and right-hand sets of cutters extend inwardly toward the shaft midpoint.

It should be noted that each cutter is counterbalanced by a second cutter spaced therefrom by an angle of 180° such that the finished rotor is dynamically balanced and can be revolved at a high rate of speed without vibration.

Figure 1:
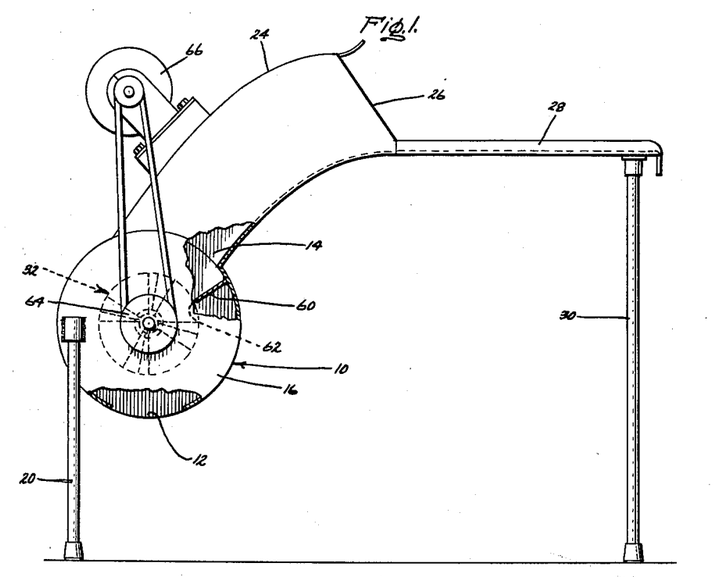
FIG. 1 is a side elevation of one embodiment of this invention partly in section and partly broken away, showing certain parts thereof in phantom.
Figure 2:
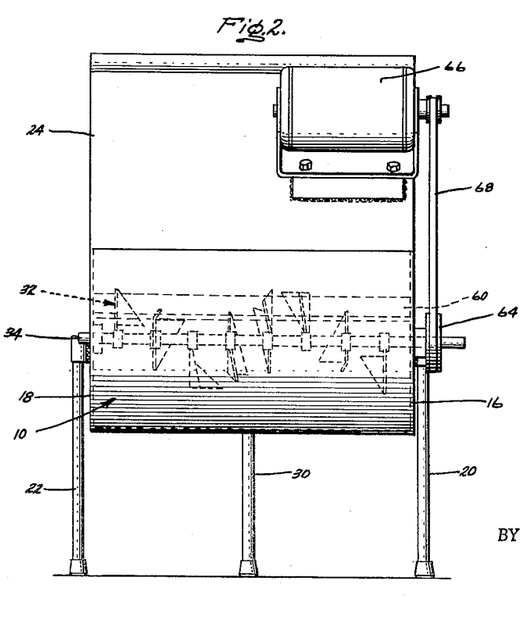
FIG. 2 is a front view thereof.

Referring now to FIGS. 1 and 3, a flat, rigid, steel shear plate 60 is fastened along one edge to the inside wall of the housing 10, this plate 60 having length corresponding to that of the rotor 32. The plate 60 extends radially inwardly a distance which disposes the inner, longitudinal edge 62 immediately adjacent to the circumference of the rotor 32, the plane of the shear plate 60 when extended falling a slight distance below the rotor center, in other words, the shaft axis. The purpose of this shear plate location will become apparent from the following description.

As seen in FIG. 1, the shear plate 60 is positioned immediately adjacent to the lower edge of the housing opening 14 whereby the plate can receive on the upper surface thereof mats projected through the chute 24.

A suitable pulley 64 is attached to one end of the shaft 34 and is connected to a suitable electric motor 66 by means of a pulley 68. The motor 66 is caused to rotate in the direction of the arrow F as indicated in the various drawings.

In operation, hydroponic mats stripped from the growing trays are laid on the table 28 and fed through the chute 26 to the upper surface of the shear plate 60. With the motor 66 energized and the rotor 32 rotating in the direction of the arrow F at a high rate of speed, the mat is rapidly fed to the rotor which slices the same both longitudinally and transversely at right angles. The mat is thereby shredded into small increments composed for the most part of whole plants composed of root and stem, the deflectors 46 on the individual cutters serving to throw the shredded material downwardly out of the housing 10 through the exhaust opening 12. Also the deflectors 46 produce a current of air which exhausts through the opening 12, thereby aiding the discharge of the shredded mats.

The machine will shred mats as fast as they are fed thereto without clogging or stalling. The shredding operation is both fast and complete, requiring only a minimum of power, the shredded material being in such form that the cattle will eat both the roots and stem and not just the stem alone, as previously.

In the typical machine constructed and successfully operated, the dimensions were as follows, it being understood that these dimensions given are exemplary only and are not limitative of the invention.

| | |
|---|---|
| Diameter of rotor 32 | 8 inches. |
| Spacing between rotor 32 periphery and edge 62 of plate 60 | Approx. .010 inch. |
| Widest axial dimension of blade 48 | 2⅜ inches. |
| Spacing between cutters 36 | 2 inches. |
| Distance from leading edge 42 and point 56 | ⅛ to ¾ inch. |
| Circumferential length of blade 48 | 4 inches. |
| Angle between disc 40 and deflector 46 | Approx. 40°. |

Figure 7:
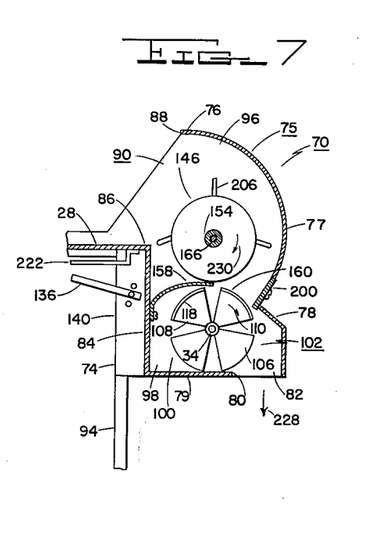
FIG. 7 is a fragmentary cross-sectional view of the apparatus of FIG. 6.

Referring now to FIGS. 6 through 10 of the drawings in which like elements are indicated by like reference numerals, the preferred embodiment of my machine for shredding hydroponic mats comprises a housing 70 again formed of suitable rigid sheet metal. Housing 70 comprises spaced opposite end plates 72 and 74 joined by a wall 75 formed of a top wall portion 76 merging with a downwardly curved, outwardly convex upper rear wall portion 77. A downwardly and outwardly extending lower rear wall portion 78 is joined to the bottom of upper rear wall portion 77 and extends to the bottom of end plates 72 and 74, as best seen in FIG. 7. A bottom wall 79 extends between side plates 72 and 74 and has its rear edge 80 spaced from lower rear wall 78 to define discharge opening 82. A front wall 84 extends upwardly from bottom wall 79 and has its top edge 86 spaced below and forwardly from the front edge 88 of top wall portion 76 thereby defining a forwardly facing feeding opening 90. A horizontally disposed chute 28 is joined to the top edge 86 of the front wall 84 thus communicating with the feeding opening 90 for feeding hydroponic mats to be shredded to the interior of the housing 70. The front end of chute 28 is supported by vertically depending legs 92 and the housing 70 is supported by rear legs 94 secured to side plates 72 and 74, as shown. It will be seen that the wall 75 and the front wall 84 generally define an upper portion 96 of the housing 70 and that the wall 78, bottom wall 79 and front wall 84 generally define a lower portion 98 of housing 70.

In the lower housing portion 98 is a rotor indicated generally by the reference numeral 100. Rotor 100 comprises a shaft 34 journaled at its opposite ends in end plates 72 and 74, the axis of the shaft being horizontal, as shown. On the shaft 34 are mounted a plurality of cutters, each indicated generally by the reference number 102, these cutters preferably being axially spaced equal distances apart on shaft 34. As in the case of the previous embodiment of the invention, all of the cutters 102 are structurally identical. Cutters 102 shown in FIGS. 7, 9 and 10 of the drawings are similar to cutters 34 shown in FIGS. 1 through 5 and may be substituted for cutters 36 in the embodiments of FIGS. 1 through 5 and likewise, cutters 36 shown in those figures may be substituted for the cutters 102 shown in FIGS. 7, 9 and 10.

Figure 9:
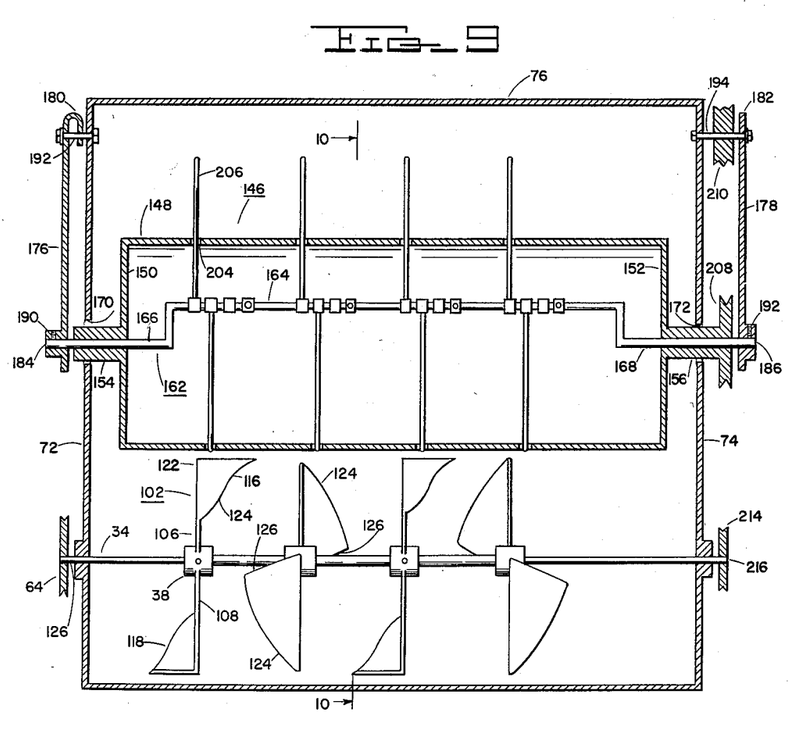
FIG. 9 is an enlarged cross-sectional view taken along line 9—9 of FIG. 8.

Each cutter 102 comprises a collar 38 secured to shaft 34 in any suitable manner such as by set screws. Welded or otherwise secured to the outer periphery of each collar 38 are two diametrically opposite segments 106 and 108 of a disc of sheet metal, such as steel, segments 106 and 108 lying in a mutual plane perpendicular to the axis of the shaft 34. With the shaft 34 and the cutter 102 rotating in the direction shown by the arrow 110 in FIG. 7, radial edges 112 and 114 of segments 106 and 108 respectively become the leading edges and preferably are sharpened.

Part-cylindrical cutting blades 116 and 118 of rigid sheet metal, such as steel, having a curvature corresponding identically to the curvature of the outer perimeters 120 of segments of 106 and 108 are respectively integrally joined along one lateral edge 122 thereof to the circumferential face of the perimeter of segments 106 and 108 and respectively extend axially in opposite directions, as best seen in FIG. 9. In this embodiment, lateral edges 122 of blades 116 and 118 are respectively coextensive in extent with perimeter 120 of segments 106 and 108. The opposite or outer lateral edges 124 of blades 116 and 118 angle or taper from the leading edges 112 and 114 of segments 106 and 108 respectively outwardly and rearwardly away from segments 106 and 108 and terminate in rear edges 126. The center of curvature of the part-cylindrical blades 116 and 118 is the axis of shaft 34 and their radius is the same as that of perimeter 120 of segments 106 and 108. It will be seen that with direction of rotation 110 of cutters 102, edges 124 of blades 116 and 118 become the leading edges and are preferably sharpened.

The radial axis of segments 106 and 108 of each cutter 102 is preferably angularly spaced by 90° from the radial axis of the segments of the adjacent cutter, as best seen in FIG. 7. This arrangement provides a completely counterbalanced rotor assembly which prevents vibration of the machine when the rotor is rotated at the desired speed, preferably between 2,000 and 3,000 r.p.m.

Figure 8:
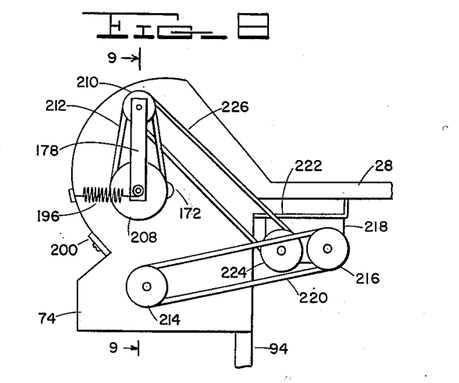
FIG. 8 is a fragmentary elevational view of the other side of the embodiment of FIG. 6.

A suitably pulley 64 is mounted on end 126 of shaft 34 exteriorly of end plate 72. Pulley 64 is driven through endless belt 128 by pulley 130 of a suitable driving motor 134 mounted on a supporting bracket 136. Bracket 136 is pivotally supported underneath chute 28, as at 138, and is adjustably connected to portions 140 of side plates 72 and 74 of front wall 84 by suitable threaded fasteners 142 selectively inserted in holes 144.

In the upper housing portion 96 is a feeding drum indicated generally by the reference number 146. Feeding drum 146 comprises circumferential wall 148 joining end walls 150 and 152. Outwardly extending concentric hub portions 154 and 156 are formed on end walls 150 and 152 of drum 146, as best seen in FIG. 9. It will be seen that the axis of the drum 146 is spaced above and parallel with the axis of shaft 34 and that the bottom peripheral surface of wall 148 of drum 146 is closely spaced from the top peripheral surface of rotor 100. A baffle plate 158 is secured to the inner surface of front wall 84 and extends into the space between wall 148 of drum 146 and rotor 100, as best seen in FIG. 7, with its rear edge defining an opening 160 communicating between the lower housing portion 98 and the upper housing portion 96.

A crank 162 is provided having an eccentric portion 164 within drum 146 and end portions 166 and 168 respectively concentrically journaled within the hub portions 154 and 156 and extending respectively therebeyond, as shown in FIG. 9. Hub portions 154 and 156 respectively extend through generally horizontally disposed slots 170 and 172 in end plates 72 and 74.

A pair of lever members 176 and 178 is provided respectively having their upper ends 180 and 182 pivotally connected by studs 192 and 194 to side plates 72 and 74 on an axis spaced above and parallel with the axis of drum 146 and hubs 154 and 156. Ends 184 and 186 of crank end portions 162 and 168 which respectively extend beyond hub portions 154 and 156 are respectively fixedly secured to hub portions 190 and 192 on the lower ends of lever members 176 and 178. It will now be seen that drum 146 is free to rotate about end portions 166 and 168 of crank 162; however, crank 162 and particularly eccentric portion 164 is stationary by virtue of the fixed connection of crank end portions 166 and 168 to the lever members 176 and 178. It will also be seen that by virtue of the provision of lever members 176 and 178, drum 146 is pivotally movable about the axis of pivot studs 192 and 194 between a rearward position with the hub portions 154 and 156 respectively engaging the rear ends of slots 170 and 172, and a forward position with the hub portions 154 and 156 engaging the forward ends of the slots. Drum 146 is biased toward its rearward position by a pair of springs 196 respectively attached to the lower ends of lever members 176 and 178 and suitable brackets 198 on rear wall 77.

A shear plate 200 is provided extending transversely across upper rear wall 77 adjacent its junction with lower rear wall 78 and is secured thereto by suitable fasteners 202, shear plate 200 extending through an opening in lower rear wall 78 into the lower housing portion 98 and toward rotor 100 so as to cooperate with the cutters 102 for shredding the mats as they are fed downwardly through openings 160 by the feeding drum 146.

Figure 10:
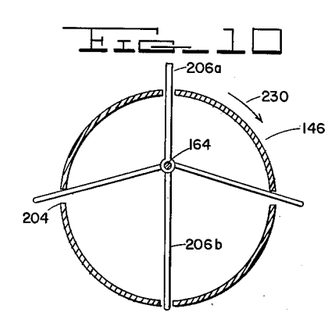
FIG. 10 is a fragmentary cross-sectional view taken along the line 10—10 of FIG. 9.

Wall 148 of drum 146 is provided with a plurality of radially spaced, axially extending rows of spaced-apart holes 204 and with a plurality of elongated feeding fingers 206 respectively extending through openings 204 and pivotally connected eccentric portion 164 of crank 162. Reference to FIGS. 9 and 10 will clearly show that eccentric portion 164 of crank 162 is disposed in a vertical plane facing away from rotor 100 and thus, that the fingers 206a which extend through the row of holes instantaneously positioned on the top peripheral surface of drum 146 extend outwardly beyond the peripheral surface of the drum a maximum distance with the fingers 206b extending through the holes which are instantaneously on the bottom peripheral surface of the drum are substantially withdrawn within the respective holes 204. Inspection of FIG. 10 will reveal that with the crank 162 and its eccentric portion 164 held stationary, as the drum 146 is rotated, a given finger 206 will be pivoted about eccentric portion 164 of crank 162 and will be progressively withdrawn as the drum rotates from a position in which the finger is extending vertically upwardly as at 206a, until it reaches the diametrically opposite position in which it is substantially withdrawn as at 206b, the finger then being progressively again extended through its respective opening until it again reaches the vertical opposite position as at 206a.

In order to rotate drum 146, a suitable pulley 208 is secured on hub portion 146 exteriorly of end wall 74, as shown. It will be observed that lever member 178 is spaced outwardly from its respective end wall 74 a greater distance than the spacing of lever member 176 from end wall 72 in order to accommodate pulley 208 and also a double pulley 210 on pivot stud 194 as best seen in FIG. 9. An endless V-bolt 212 is trained around pulley 208 and one of the grooves of pulley 210 in order to drive pulley 208 and drum 126, this arrangement accommodating the aforesaid pivotal movement of the drum 146. In order to drive pulley 210 a pulley 214 is secured on end 216 of shaft 34 exteriorly of end wall 74 and is connected to input pulley 216 of a suitable gear box 218 by an endless V-belt 220. Gear box 218 is mounted below chute 28 by means of a suitable bracket 222. The output pulley 224 of gear box 218 is in turn coupled to the other groove of pulley 210 by endless V-belt 226. Gear box 218 is of the step-down variety since rotor 100 is preferably operated at a relatively high rate of speed, i.e. 2,000 to 3,000 r.p.m. while the feeding drum 146 is preferably operated at a much lower rate of speed, i.e. 100 to 150 r.p.m.

It will now be seen that as the hydroponic mats are fed into the feeding opening 90 of housing 70, they are engaged by the feeding fingers 206 of feeding drum 146, carried upwardly and rearwardly into engagement with the inner surface of wall 75, then downwardly still in engagement with the inner surface of wall 75, and finally through opening 160 into shredding engagement with the rotor 100, the shredded material being discharged downwardly through the discharge opening 82 as shown by the arrow 228. It will be readily apparent that the pivotal securement of feeding fingers 206 to eccentric portion 164 of crank 162 permits the feeding fingers to be withdrawn as they approach the rotor 100 so as to clear the same and baffle member 158 as the rotor 100 rotates in the direction shown by the arrow 230. The pivotal motion of drum 146 provided by lever members 176 and 178 and the rearward biasing of drum 146 provided by springs 196 continually urges the mats being fed to the rotor 100 against the inner surface of wall 75 and accommodates mats of varied thickness.

Referring now to FIGS. 11 through 14 of the drawings in which like elements are again indicated by like reference numerals, the preferred embodiment of my invention for shredding hydroponic mats, generally indicated at 230, is preferably supported on the exterior of the vertical wall 232 of a building (not shown) in which the hydroponic mats are grown. The machine 230 comprises a housing 242 formed of suitable rigid sheet metal. Housing 242 comprises spaced opposite end walls 244 and 246 and side wall 248 defining upper and lower housing portions 250 and 252. It will be seen that in this embodiment the building wall 232 forms a side wall of housing 242 opposite from wall 248. Feeding opening 254 is formed in wall 232 communicating with the upper housing portion 250, and a downwardly facing discharge opening 256 is formed in the bottom of the lower housing portion 252. A feeding chute 258 normally extends outwardly from feeding opening 254 on the side of wall 232 remote from the machine 230, chute 258 being pivotally supported by means of suitable brackets 260 so that it may be swung out of its operative position, as shown, into a position closing opening 254, as shown by arrows 262.

Rotor 100 is positioned in lower housing portion 252 and comprises horizontally extending shaft 34 journaled at its opposite ends in end walls 244 and 246. A plurality of axially spaced cutters 102 are mounted on shaft 34 as shown. Cutters 102 are preferably of the type shown in FIGS. 7, 9 and 10, however it will be readily understood that cutters of the type shown in FIGS. 3, 4 and 5 may be employed.

Figure 11:
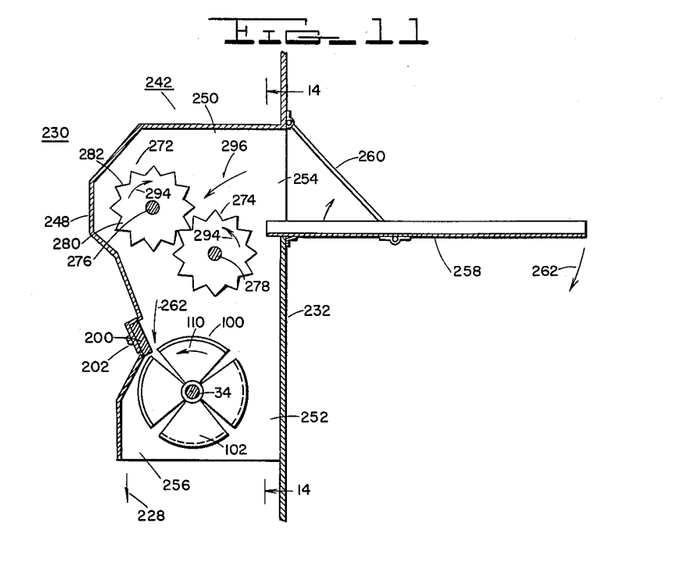
FIG. 11 is a cross-sectional view illustrating a further embodiment of my invention.

Shear plate 200 is again provided extending transversely across housing wall 248 and secured thereto by suitable fasteners 202. Shear plate 200 extends through an opening in the wall 248 into the lower housing portion 252 and toward rotor 100 so as to cooperate with the cutters 102 as the rotor 100 is rotated in the direction shown by the arrow 110 for shredding the mats as they are fed downwardly as shown by the arrow 262.

Figure 13:
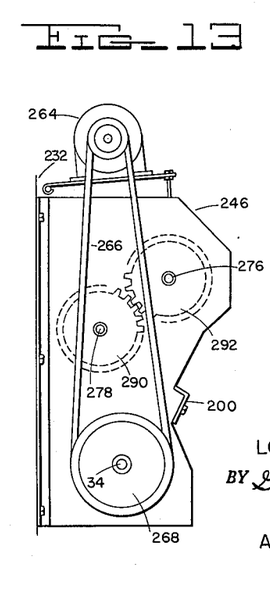
FIG. 13 is an elevational view of the other side of the embodiment of FIG. 11.
Figure 14:
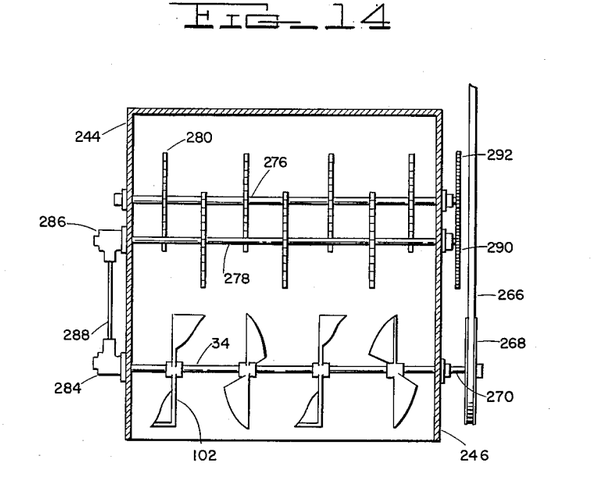
FIG. 14 is a cross-sectional view taken along the line 14—14 of FIG. 11.

In this embodiment, driving motor 264 is mounted on top of housing 242 as shown, and drives rotor 100 by means of belt 266 and pulley 268 on extension 270 of shaft 34 exteriorly of end wall 246.

In order to provide for positively feeding the hydroponic mats fed through the opening 254 to the rotor 100, I provide rotors 272 and 274 disposed in the upper housing portion 250. Rotors 272 and 274 respectively comprise horizontally disposed shafts 276 and 278 journaled in end walls 244 and 246, shafts 276 and 278 being parallel with shaft 34 and rotor 100, as shown. Mounted on shafts 276 and 278 are a plurality of axially spaced feeding elements 280. It will be clear by reference to FIG. 14 that the feeding elements 280 on shaft 278 are equally spaced between the feeding elements on the shaft 276. Feeding elements 280 are generally disc-shaped, being formed of suitable rigid sheet metal and have a plurality of circumferentially spaced points 282 formed on their outer peripheries as shown. Shafts 276 and 278 are further spaced apart by a distance such that the feeding elements 282 overlap in a direction parallel with the shafts, as best seen in FIG. 11.

Figure 12:
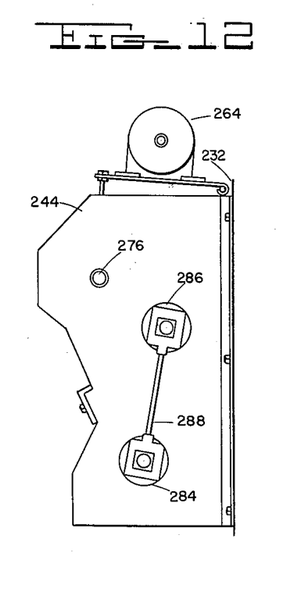
FIG. 12 is an elevational view of one side of the embodiment of FIG. 11.

Shaft 278 is driven from shaft 34 by means of worm drives 284 and 286 and an interconnecting drive shaft 288 exteriorly of end wall 244. The worm drives 284 and 286 effect a substantial speed reduction between the shaft 34 and the shaft 278, the shaft 34 in a specific embodiment of my invention being operated at a speed of 1450 r.p.m. and the shafts 278 and 276 being operated at a speed of 8 r.p.m. Shaft 276 is driven at the same speed but in the opposite direction from shaft 278 by means of gears 290 and 292 exteriorly of end wall 246. Feeding elements 280 of rotors 272 and 274 are thus rotated in opposite directions as shown by the arrows 294 and it will now be seen that as the hydroponic mats are fed through the opening 254 in the direction shown by the arrow 296, they will be engaged between the feeding elements 280 of rotors 272 and 274 and fed downwardly in the direction shown by the arrow 262 to the rotor 100, the resulting shredded mats being discharged downwardly as shown by the arrow 228.

I have found that while the feeding elements 280 of rotors 272 and 274 normally engage and feed the mats to the rotor 100, in the event that the machine tends to become clogged the feeding elements 280 will merely cut themselves free, forming slits in the mat which then permits the machine to be shut down and the mat withdrawn to in turn permit cleaning of the machine.

While I have described above the principles of my invention in connection with specific apparatus, it is to be clearly understood that this description is made only by way of example and not as a limitation to the scope of my invention.

What is claimed is:

1. A machine for shredding hydroponic mats comprising a cylindrical housing having opposite end plates, said housing having a first longitudinally extending opening formed therein, said housing having a second longitudinally extending opening formed therein spaced a predetermined distance from said first opening, a chute communicating with said second opening for feeding hydroponic mats to the interior of said housing, a rotor in said housing mounted for rotation about an axis coincident with the axis of said housing; said rotor comprising a shaft coaxial with said axis and journaled in said end plates, a plurality of axially spaced cutters on said shaft spaced equal distances apart, each cutter comprising at least one quarter segment of a rigid annular disc secured at its inner perimeter to said shaft and lying in a plane normal to said axis, the leading radial edge of the segment being sharp, the aft portion of the segment being bent inwardly at an obtuse angle along a radius, a part-cylindrical axially extending cutting blade joined along one lateral edge thereof to the circumferential face of the outer perimeter of the segment starting at a point spaced from said leading edge and terminating adjacent to said bent portion, the opposite lateral edge of said blade extending angularly outwardly from said segment adjacent to said leading edge of the aft edge of said blade, said opposite lateral edge being sharpened, the curvature of said blade being the same as the outer perimeter of said segment; the spacing between said cutters being equal to the maximum lateral dimension of the cutting blade, said cutters being angularly spaced on said shaft, a shear plate mounted on said housing to extend radially inwardly toward and just short of the periphery of said rotor, said shear plate extending axially of said housing and being disposed adjacent to one side of the second opening, and means for rotating said shaft.

2. A machine for shredding hydroponic mats comprising a housing having opposite end plates, said housing having a first longitudinally extending opening formed therein, said housing having a second longitudinally extending opening formed therein spaced a predetermined distance from said first opening, a chute communicating with said second opening for feeding hydroponic mats to the interior of said housing, a rotor in said housing; said rotor comprising a shaft journaled for rotation in said end plates, a plurality of axially spaced cutters on said shaft, each cutter comprising at least one segment of a rigid annular disc secured at its inner perimeter to said shaft and lying in a plane normal to said axis, the aft portion of the segment being bent inwardly at an obtuse angle along a radius, a part-cylindrical axially extending cutting blade joined along one lateral edge thereof to the circumferential face of the perimeter of the segment, the opposite lateral edge of said blade extending angularly outwardly from said segment adjacent to said leading edge to the aft edge of said blade, the curvature of said blade being the same as the outer perimeter of said segment; said cutters being angularly spaced on said shaft, a shear plate mounted on said housing to extend radially inwardly toward and just short of the periphery of said rotor, said shear plate extending axially of said housing and being disposed adjacent to one side of the second opening.

3. A machine for shredding hydroponic mats comprising a housing having opposite end plates, said housing having a first longitudinally extending opening formed therein, said housing having a second longitudinally extending opening formed therein spaced a predetermined distance from said first opening, a chute communicating with said second opening for feeding hydroponic mats to the interior of said housing, a rotor in said housing; said rotor comprising a shaft journaled for rotation in said end plates, a plurality of axially spaced cutters on said shaft, each cutter comprising at least one segment of a rigid annular disc secured at its inner perimeter to said shaft and lying in a plane normal to said axis, a part-cylindrical axially extending cutting blade joined along one lateral edge thereof to the circumferential face of the perimeter of the segment, the opposite lateral edge of said blade extending angularly outwardly from said segment adjacent to said leading edge to the aft edge of said blade, the curvature of said blade being the same as the outer perimeter of said segment; a shear plate mounted on said housing to extend radially inwardly toward and just short of the periphery of said rotor, said shear plate extending axially of said housing.

4. A machine for shredding hydroponic mats comprising a housing having spaced apart mat-receiving and exhaust openings, a rotor in said housing; said rotor comprising a shaft journaled in said housing for rotation, a plurality of axially spaced cutters on said shaft; each cutter comprising at least one segment of a rigid annular disc secured at its inner perimeter to said shaft and lying in a plane normal to the shaft axis, the leading radial edge of said segment being sharp, a part-cylindrical axially extending cutting blade joined along one lateral edge thereof to the circumferential face of the perimeter of the segment, the opposite lateral edge of said blade extending angularly outwardly from said segment adjacent to said leading edge to the aft edge of said blade, said opposite lateral edge being sharpened, the curvature of said blade being the same as the outer perimeter of said segment; said cutters being angularly spaced on said shaft, a shear plate fixedly mounted in said housing to extend radially inwardly toward and just short of the periphery of said rotor, said shear plate extending axially of said shaft.

5. A machine for shredding hydroponic mats comprising a housing having spaced apart mat-receiving and exhaust openings, a rotor in said housing, said rotor comprising a shaft journaled in said housing for rotation, a plurality of axially spaced cutters on said shaft; each cutter comprising at least one segment of a rigid annular disc secured at its inner perimeter to said shaft and lying in a plane normal to the shaft axis, a part-cylindrical axially extending cutting blade joined along one lateral edge thereof to the circumferential face of the outer perimeter of the segment, the opposite lateral edge of said blade extending angularly outwardly from said segment adjacent to said leading edge to the aft edge of said blade, the curvature of said blade being the same as the outer perimeter of said segment; said cutters being angularly spaced on said shaft, a shear plate fixedly mounted in said housing to extend radially inwardly toward and just short of the periphery of said rotor, said shear plate extending axially of said shaft.

6. For use in a machine for shredding hydroponic mats, a rotor, said rotor comprising a shaft, a plurality of axially spaced cutters on said shaft, each cutter comprising at least one segment of a rigid annular disc secured at its inner perimeter to said shaft and lying in a plane normal to the shaft axis, the leading radial edge of said segment being sharp, a part-cylindrical axially extending cutting blade joined along one lateral edge thereof to the circumferential face of the perimeter of the segment, the opposite lateral edge of said blade extending angularly outwardly from said segment adjacent to said leading edge to the aft edge of said blade, said opposite lateral edge being sharpened, the curvature of said blade being the same as the outer perimeter of said segment; said cutters being angularly spaced on said shaft.

7. For use in a machine for shredding hydroponic mats, a rotor, said rotor comprising a shaft, a plurality of axially spaced cutters on said shaft, each cutter comprising a quarter segment of a rigid annular disc secured at its inner perimeter to said shaft and lying in a plane normal to the shaft axis, the leading radial edge of said segment being sharp, the aft portion of the segment being bent inwardly at an obtuse angle along a radius, a part-cylindrical cutting blade joined along one lateral edge to the circumferential face of the perimeter of the segment starting at a point spaced rearwardly from said leading edge and terminating adjacent to said bent portion, the opposite lateral edge of said blade extending angularly outwardly from said segment adjacent to said leading edge to the aft edge of said blade, said opposite lateral edge being sharpened, the curvature of said blade being the same as the outer perimeter of said segment; the spacing between the said cutters being equal to the maximum lateral dimension of the cutting blade, said cutters being angularly spaced on said shaft.

8. A machine for shredding hydroponic mats comprising; a housing having spaced opposite vertical end plates, said housing having communicating upper and lower portions, said upper housing portion having a top wall merging into a rear wall which is downwardly curved and outwardly convex in cross section, said lower housing portion having a rear wall joined to said upper housing portion rear wall and extending outwardly and downwardly therefrom, said lower housing portion having a bottom wall with a discharge opening formed therein adjacent said rear wall thereof, said housing having a front wall common to said upper and lower portion, said front wall joining said bottom wall and having its top edge spaced from said top wall to define a forwardly facing opening in said upper housing portion; a horizontally disposed chute communicating with said opening for feeding mats to the interior of said housing; a rotor in said lower housing portion mounted for rotation about a horizontal axis, said rotor comprising a shaft journaled in said end plates and having portions respectively extending exteriorly thereof, and a plurality of axially spaced cutters on said shaft, each cutter comprising a pair of diametrically opposite segments of a rigid annular disc secured at its inner perimeter to said shaft and lying in a plane normal to the axis of said shaft, the leading radial edge of each segment being sharp, a part-cylindrical axially extending cutting blade joined along one lateral edge thereof to the circumferential face of the outer perimeter of each segment and coextensive therewith, the opposite lateral edge of said blade extending angularly outwardly from said segment adjacent said leading edge to the aft edge of said blade, said opposite lateral edge being sharpened, the curvature of said blade being the same as the outer perimeter of said segment, the blades of each cutter extending in opposite directions, each cutter being disposed with the radial axis of its segments displaced by 90° from the radial axis of the segments of the adjacent cutter; a shear plate mounted transversely on said rear wall of said upper housing portion adjacent its junction with said lower housing portion rear wall and extending through said lower housing portion rear wall toward said rotor to cooperate with said cutters for shredding said mats; driving means on one of said rotor shaft extension portions for rotating said rotor shaft in a direction such that the leading edges of said segments approach said shear plate downwardly; a feeding drum in said upper housing portion exposed to said opening therein and mounted for rotation about an axis parallel with the axis of said rotor shaft, said feeding drum being closely spaced from the periphery of said rotor; a partition member extending from said front wall into the space between said drum and rotor and defining an opening with said upper housing portion rear wall and communicating between said upper and lower housing portions, said drum having concentric hub portions respectively formed on the ends thereof, said hub portions respectively extending through generally horizontally extending slots formed in said end plates; one of said hub portions having first pulley means formed thereon exteriorly of the one respective end plate; a crank having an eccentric portion disposed within said drum and having end portions respectively journaled in said hub portions whereby said drum is rotatable with respect to said crank, said crank end portions respectively extending beyond said hub portion; a pair of lever members respectively having their upper ends pivotally connected to said end plates at points spaced above said crank end portions, said crank end portions being respectively fixedly secured to the lower end of said lever members whereby said drum is pivotally movable about said points from a first position with said hub portions respectively engaging the ends of said slots toward said upper housing portion rear wall to a second position with said holes respectively engaging the other ends of said slots; spring means respectively biasing said lever members toward the first position of said drum; said drum having a plurality of axially extending rows of holes therein spaced around the periphery thereof; a plurality of feeding fingers respectively pivotally connected to said crank eccentric portion and extending through respective holes in said drum, said crank eccentric portion being disposed so that the fingers in the row of holes diametrically opposite from said rotor extend a maximum distance beyond the periphery of said drum and the fingers in the row of holes facing said rotor are substantially withdrawn into the respective holes; the lever member on the same end of the said housing as said first pulley means being pivotally connected to said one end plate by stud means having second double pulley means thereon; first endless drive means trained around said first pulley means and said second pulley means; third pulley means on one of said rotor shaft exterior portions; a speed reducer forwardly of said housing and below said chute, said speed reducer having fourth driving pulley means and a fifth driven pulley means; second endless drive means trained around said third and fourth pulley means; and third endless drive means trained around said fifth and second pulley means.

9. A machine for shredding hydroponic mats comprising: a housing having side walls joined to opposite end walls, said side walls having an opening formed in the upper portion thereof for feeding mats to the interior of said housing, said side walls having a discharge opening formed in the lower portion thereof; a rotor in said housing mounted for rotation about a horizontal axis, said rotor comprising a shaft journaled in said end walls and a plurality of axially spaced cutters on said shaft, each cutter comprising at least one segment of a rigid annular disc secured at its inner perimeter to said shaft and lying in a plane normal to the axis of said shaft, the leading radial edge of each segment being sharp, a part-cylindrical axially extending cutting blade joined along one lateral edge thereof to the circumferential face of the outer perimeter of each segment, the opposite lateral edge of said blade extending angularly outwardly from said segment adjacent said leading edge to the aft edge of said blade, said opposite lateral edge being sharp, the curvature of said blade being the same as the outer perimeter of said segment, said cutters being angularly spaced on said shaft; a shear plate mounted on said side walls adjacent said discharge opening and extending into said housing toward said rotor to cooperate with said cutters for shredding said mats; means for rotating said rotor shaft; a feeding drum in said housing exposed to said feeding opening and mounted for rotation about an axis parallel with and above the axis of said rotor shaft, said feeding drum being closely spaced from the periphery of said rotor, said drum having concentric hub portions respectively formed on the ends thereof respectively extending through generally horizontally extending slots formed in said housing end walls, one of said hub portions having first pulley means formed thereon exteriorly of the one respective end wall; a crank having an eccentric portion disposed within said drum and having end portions respectively journaled in said hub portions whereby said drum is rotatable with respect to said crank; a pair of lever members respectively having their upper ends pivotally connected to said end walls at points spaced above said crank end portions, said crank end portions being respectively fixedly secured to the lower ends of said lever members whereby said crank remains stationary when said drum is rotated and said drum is pivotally movable about said points a distance defined by the length of said slots; means biasing said drum and lever members rearwardly toward the rear portion of said side walls; said drum having a plurality of rows of holes therein spaced around the periphery thereof; a plurality of feeding fingers respectively pivotally connected to said crank eccentric portion and extending through respective holes in said drum, said crank eccentric portion being disposed so that the fingers in the row of holes diametrically opposite from said rotor extend a maximum distance beyond the periphery of said drum and the fingers in the row of holes facing said rotor are substantially withdrawn into the respective holes; second double pulley means rotatably mounted coaxially with the point of connection of the respective lever member with said one side wall; endless drive means trained around said first and second pulley means; and other endless drive means trained around said second pulley means for rotating the same.

10. A machine for shredding hydroponic mats comprising: a housing having side walls joined to opposite end walls, said side walls having an opening formed in the upper portion thereof for feeding mats to the interior of said housing, said side walls having a discharge opening formed in the lower portion thereof; a rotor in said housing mounted for rotation about a horizontal axis, said rotor comprising a shaft journaled in said end walls and a plurality of axially spaced cutters on said shaft, each cutter comprising at least one segment of a rigid annular disc secured at its inner perimeter to said shaft and lying in a plane normal to the axis of said shaft, the leading radial edge of each segment being sharp, a part-cylindrical axially extending cutting blade joined along one lateral edge thereof to the circumferential face of the outer perimeter of each segment, the opposite lateral edge of said blade extending angularly outwardly from said segment adjacent said leading edge to the aft edge of said blade, said opposite lateral edge being sharp, the curvature of said blade being the same as the outer perimeter of said segment, said cutters being angularly spaced on said shaft; a shear plate extending into said housing toward said rotor to cooperate with said cutters for shredding said mats; means for rotating said rotor shaft; a feeding drum in said housing exposed to said feeding opening and mounted for rotation about an axis parallel with and above the axis of said rotor shaft; a crank having an eccentric portion disposed within said drum and having end portions respectively concentrically journaled in the ends of said drum and extending therefrom whereby said drum is rotatable with respect to said crank, said crank end portions respectively extending through generally horizontally extending slots formed in said housing end walls; a pair of lever members respectively having their upper ends pivotally connected to said end walls at points spaced above said crank end portions, said crank end portions being respectively fixedly secured to the lower ends of said lever members whereby said crank remains stationary when said dum is rotated and said drum is pivotably movable about said points a distance defined by the length of said slots; a first pulley means secured to one end of said drum and concentric with the respective crank end portion; said drum having a plurality of rows of holes therein spaced around the periphery thereof; a plurality of feeding fingers respectively pivotally connected to said crank eccentric portion and extending through respective holes in said drum, said crank eccentric portion being disposed so that the fingers in the row of holes diametrically opposite from said rotor extend a maximum distance beyond the periphery of said drum and the fingers in the row of holes facing said rotor are substantially withdrawn into the respective holes; second pulley means mounted for rotation about an axis concentric with said points; endless drive means trained around said first and second pulley means; and means for rotatably driving said second pulley means.

11. A machine for shredding hydroponic mats comprising: a housing having side walls joined to opposite end walls, said side walls having an opening formed in the upper portion thereof for feeding mats to the interior of said housing, said side walls having a discharge opening formed in the lower portion thereof; a rotor in said housing mounted for rotation about a horizontal axis, said rotor comprising a shaft journaled in said end walls and a plurality of axially spaced cutters on said shaft, each cutter comprising at least one segment of a rigid annular disc secured at its inner perimeter to said shaft and lying in a plane normal to the axis of said shaft, a part-cylindrical axially extending cutting blade joined along one lateral edge thereof to the circumferential face of the outer perimeter of each segment, the opposite lateral edge of said blade extending angularly outwardly from said segment adjacent said leading edge to the aft edge of said blade, the curvature of said blade being the same as the outer perimeter of said segment, a shear plate extending into said housing toward said rotor to cooperate with said cutters for shredding said mats; means for rotating said rotor shaft; a feeding drum in said housing exposed to said feeding opening and mounted for rotation about an axis parallel with and above the axis of said rotor shaft, said drum comprising shaft means having end portions respectively concentrically journaled in the ends of said drum and extending through generally horizontally extending slots formed in said housing end walls; a pair of lever members respectively having their upper ends pivotally connected to said end walls at points spaced above said shaft means end portions, said shaft means end portions being respectively fixedly secured to the lower ends of said lever members whereby said shaft means remains stationary when said drum is rotated and said drum is pivotally movable about said points a distance defined by the length of said slots; first pulley means on said drum and concentric therewith; said drum having a plurality of rows of holes therein spaced around the periphery thereof; a plurality of feeding fingers respectively extending through said holes; means on said shaft means within said drum and cooperating with said fingers for extending the fingers in the row of holes diametrically opposite from said rotor a maximum distance beyond the periphery of said drum and for withdrawing the fingers in the rows of holes facing said rotor substantially into the respective holes; second pulley means mounted for rotation about an axis concentric with said points; endless drive means trained around said first and second pulley means; and means for rotatably driving said second pulley means.

12. A machine for shredding hydroponic mats comprising: a housing having side walls joined to opposite end walls, said side walls having an opening formed in the upper portion thereof for feeding mats to the interior of said housing, said side walls having a discharge opening formed in the lower portion thereof; a rotor in said housing mounted for rotation about a horizontal axis, said rotor comprising a shaft journaled in said end walls and a plurality of axially spaced cutters on said shaft, each cutter comprising at least one segment of a rigid annular disc secured at its inner perimeter to said shaft and lying in a plane normal to the axis of said shaft, a part-cylindrical axially extending cutting blade joined along one lateral edge thereof to the circumferential face of the outer perimeter of each segment, the opposite lateral edge of said blade extending angularly outwardly from said segment adjacent said leading edge to the aft edge of said blade; a feeding drum in said housing exposed to said feeding opening and mounted for rotation about an axis parallel with and above the axis of said rotor shaft, said drum comprising shaft means respectively concentrically extending from the ends thereof; a pair of lever members respectively having their upper ends pivotally connected to said end walls at points spaced above said drum shaft means, said shaft means being respectively supported by the lower ends of said lever members whereby said drum is pivotally movable about said points; first pulley means on said drum and concentric therewith; said drum having a plurality of feeding fingers each movable between an extended position and a retracted position; means cooperating with said fingers for respectively moving the same to the retracted position when the respective finger is adjacent a position facing said rotor and to the extended position when the respective finger is rotationally displaced from said facing position; second pulley means mounted for rotation about an axis concentric with said points; endless drive means trained around said first and second pulley means; and means for rotatably driving said second pulley means.

13. A machine for shredding hydroponic mats comprising; a housing having side walls joined to opposite end walls, said side walls having an opening formed in the upper portion thereof for feeding mats to the interior of said housing, said side walls having a discharge opening formed in the lower portion thereof; a rotor in said housing mounted for rotation about a horizontal axis, said rotor comprising a shaft journaled in said end walls and a plurality of axially spaced cutters on said shaft, each cutter comprising at least one segment of a rigid annular disc secured at its inner perimeter to said shaft and lying in a plane normal to the axis of said shaft, a part-cylindrical axially extending cutting blade joined along one lateral edge thereof to each segment at the perimeter thereof, the opposite lateral edge of said blade extending angularly outwardly from said segment adjacent said leading edge to the aft edge of said blade, the curvature of said blade being the same as the outer perimeter of said segment; a shear plate extending into said housing toward said rotor to cooperate with said cutters for shredding said mats; means for rotating said rotor shaft; a feeding drum in said housing exposed to said feeding opening and mounted for rotation about an axis parallel with and above the axis of said rotor shaft, means for pivotally moving said drum about an axis spaced from and parallel with the axis of said drum; means for rotating said drum; said drum having a plurality of feeding fingers each movable between an extended position and a retracted position; and means cooperating with said fingers for respectively moving the same to the retracted position when the respective finger is adjacent a position facing said rotor and to the extended position when the respective finger is rotationally displaced from said facing position.

14. A machine for shredding hydroponic mats comprising a frame, a rotor on said frame, said rotor comprising a shaft having a plurality of cutters thereon, each said cutter having a first cutting portion extending radially from the shaft in a plane perpendicular to the shaft axis, a second curved cutting portion on the outer periphery of said first cutting portion and extending in a direction parallel to and circumferentially of the shaft axis, said second curved cutting portion being concentric about said axis, whereby said cutters cut through said mats in orthogonal directions for shredding the same.

15. A machine for shredding hydroponic mats comprising: a housing having upper and lower portions, said housing having an opening formed in said upper portion thereof for feeding mats to the interior of said housing, said housing having a discharge opening formed in said lower portion thereof; a first rotor in said lower housing portion mounted for rotation about a horizontal axis, said first rotor comprising a shaft having a plurality of axially spaced cutters thereon, each cutter comprising at least one segment of a rigid annular disc secured at its inner perimeter to said shaft and lying in a plane normal to the axis of said shaft, each segment having leading and aft edges, a part-cylindrical axially extending cutting blade joined along one lateral edge thereof to each segment at the outer perimeter thereof, the opposite lateral edge of said blade extending angularly outwardly from said segment adjacent said leading edge to the aft edge thereof, the curvature of said blade being the same as the outer perimeter of said segment; a shear plate extending into said housing toward said rotor to cooperate with said cutters for shredding said mats; means for rotating said first rotor shaft; second and third rotors in said upper housing portion exposed to said feeding opening and respectively mounted for rotation about axes parallel with and above the axis of said first rotor shaft, each of said second and third rotors comprising a shaft having a plurality of axially spaced mat-feeding elements thereon, the elements of said second rotor being disposed between the elements of said third rotor; and means for rotating said second and third rotor shafts in opposite directions thereby to feed mats between the respective elements thereon toward said first rotor.

16. The combination of claim 15 wherein said second and third rotor shafts are spaced apart a distance such that the elements of said second and third rotors overlap in a direction parallel with said shafts.

17. The combination of claim 15 wherein said elements respectively have circumferentially spaced points formed on their peripheries.

18. The combination of claim 15 wherein said mat-feeding elements are respectively disc-shaped with a plurality of circumferentially spaced points formed on their peripheries, wherein said second and third rotor shafts are spaced apart a distance such that the elements of said second and third rotors overlap in a direction parallel with said shafts, and wherein said means for rotating said second and third rotor shafts is operatively connected to said first rotor shaft and arranged to rotate said second and third rotor shafts at speeds substantially lower than the speed of said first rotor shaft.

19. A machine for shredding hydroponic mats comprising: a housing having a side wall joined to opposite end walls and defining communicating upper and lower housing portions, said side wall having an opening formed therein communicating with said upper housing portion for feeding mats thereto, said side wall having a discharge opening formed therein communicating with said lower housing portion; a first rotor in said lower housing portion mounted for rotation about a horizontal axis, said first rotor comprising a first shaft journaled in said end walls and having a plurality of axially spaced cutters thereon, each cutter comprising at least one segment of a rigid annular disc secured at its inner perimeter to said first shaft and lying in a plane normal to the axis thereof, each segment having leading and aft edges, a part-cylindrical axially extending cutting blade joined along one lateral edge thereof to each segment at the outer perimeter thereof, the opposite lateral edge of said blade extending angularly outwardly from said segment adjacent said leading edge to the aft edge thereof, the curvature of said blade being the same as the outer perimeter of said segment; a shear plate removably mounted transversely on said side wall and extending into said lower housing portion toward said rotor to cooperate with said cutters for shredding said mats; drive means on said first shaft exteriorly of one of said end walls for rotating said first shaft in a direction such that said leading edges of said segments approach said shear plate downwardly; second and third rotors in said upper housing portion exposed to said feeding opening and respectively mounted for rotation about axes parallel with and above the axis of said first shaft, said second and third rotors respectively comprising second and third shafts journaled in said end walls and having a plurality of axially spaced mat feeding elements thereon, the elements on said second shaft being equally spaced between the elements on said third shaft, each of said elements being disc-shaped with a plurality of circumferentially spaced points formed on their peripheries, said second and third shafts being spaced apart a distance such that said elements on said second and third shafts overlap in a direction parallel with said shafts; speed reducing means connecting said first and second shafts exteriorly of one of said end walls for rotating said second shaft at a speed less than the speed of said first shaft; and drive means connecting said second and third shafts for rotating said third shaft, said speed reducing means and last-named drive means rotating said second and third shafts in opposite directions thereby to feed mats between the respective elements thereon toward said first rotor.

20. For use in a machine for shredding hydroponic mats, a rotor, said rotor comprising a shaft, a plurality of axially spaced cutters on said shaft, each cutter comprising two diametrically opposite segments of a rigid annular disc secured at the center thereof to said shaft and lying in a plane normal to the shaft axis, the leading radial edges of said segments being sharp, two part-cylindrical cutting blades joined along one lateral edge to the circumferential perimetral portion of said two segments, respectively, and extending in opposite directions, said blades starting adjacent to the leading edges of the respective segments and extending toward the aft edges thereof, the opposite lateral edges of said blades, respectively, extending angularly outwardly from the respective segments adjacent to the leading edges toward the aft edges thereof, said opposite lateral edges being sharpened; said cutters being spaced apart both axially and angularly on said shaft.

21. A machine for shredding hydroponic mats comprising a frame, a first rotor mounted on said frame for rotation about an axis, said first rotor comprising a shaft having a plurality of axially spaced cutters thereon, each cutter comprising at least one segment of a rigid annular disc secured at its inner perimeter to said shaft and lying in a plane normal to the axis of said shaft, each segment having leading and aft edges, a part-cylindrical axially extending cutting blade joined along one lateral edge thereof to each segment at the outer perimeter thereof, the opposite lateral edge of said blade extending angularly outwardly from said segment in a direction from said leading edge toward the aft edge thereof, the curvature of said blade being the same as the outer perimeter of said segment; a shear plate on said frame extending toward said rotor to cooperate with said cutters for shredding said mats; means for rotating said first rotor shaft;

second and third rotors mounted on said frame for rotation about axes parallel to the axis of said first rotor, said second and third rotors being positioned in adjacent operative relation with respect to said first rotor, each of said second and third rotors comprising a shaft having a plurality of axially spaced mat-feeding elements thereon, the elements of said second rotor being disposed between the elements of said third rotor; and means for rotating said second and third rotor shafts in opposite directions thereby to feed mats between the respective elements thereon toward said first rotor.

References Cited in the file of this patent
UNITED STATES PATENTS

| | | |
|---|---|---|
| 810,204 | Harrison et al. | Jan. 16, 1906 |
| 1,277,344 | McCargar | Aug. 27, 1918 |
| 2,969,820 | Gruendler | Jan. 31, 1961 |
| 2,998,834 | Carlson et al. | Sept. 5, 1961 |